(12) United States Patent
Lu

(10) Patent No.: US 9,564,814 B2
(45) Date of Patent: Feb. 7, 2017

(54) CONTROLLER FOR ADJUSTING AN OUTPUT VOLTAGE OF A POWER CONVERTER AND RELATED METHOD THEREOF

(71) Applicant: Leadtrend Technology Corp., Hsin-Chu (TW)

(72) Inventor: Hsin-Hung Lu, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 37 days.

(21) Appl. No.: 14/505,503

(22) Filed: Oct. 3, 2014

(65) Prior Publication Data
US 2015/0098256 A1    Apr. 9, 2015

Related U.S. Application Data

(60) Provisional application No. 61/886,670, filed on Oct. 4, 2013.

(51) Int. Cl.
*H02M 3/335* (2006.01)
*H02M 1/00* (2006.01)

(52) U.S. Cl.
CPC . *H02M 3/33523* (2013.01); *H02M 2001/0025* (2013.01)

(58) Field of Classification Search
CPC . G05F 1/565; G05F 1/575; H02M 2001/0009; H02M 2001/0025; H02M 3/3155; H02M 3/33507; H02M 3/33513; H02M 3/33523; H02M 3/157; H02M 3/156; H02M 7/53871

USPC ....... 323/241, 246, 266, 274, 275, 281–285; 363/21.13, 21.16, 21.18, 78–80
See application file for complete search history.

(56) References Cited

U.S. PATENT DOCUMENTS

| | | | |
|---|---|---|---|
| 7,342,812 B2 | 3/2008 | Piper | |
| 7,609,533 B2 | 10/2009 | Chuang | |
| 8,045,344 B2 | 10/2011 | Grant | |
| 2007/0103134 A1* | 5/2007 | Yang | H02M 3/33523 323/282 |
| 2010/0033136 A1 | 2/2010 | Yang | |
| 2014/0268924 A1* | 9/2014 | Tang | H02M 3/33507 363/21.17 |

FOREIGN PATENT DOCUMENTS

CN    101677219 A    3/2010
CN    102545636 A    7/2012

* cited by examiner

*Primary Examiner* — Adolf Berhane
*Assistant Examiner* — Gary Nash
(74) *Attorney, Agent, or Firm* — Winston Hsu; Scott Margo

(57) ABSTRACT

A controller for adjusting an output voltage of a power converter includes a gate control signal generation circuit, a feedback signal detection module, and a reference voltage generation module. The gate control signal generation circuit generates a gate control signal to a power switch of a primary side of the power converter according to a reference voltage and a plurality of signals corresponding to the primary side and a secondary side of the power converter. The feedback signal detection module generates a logic signal according to a combination corresponding to the plurality of signals. The reference voltage generation module generates the reference voltage to the gate control signal generation circuit according to the logic signal. The power switch adjusts the output voltage of the secondary side of the power converter according to the gate control signal.

6 Claims, 8 Drawing Sheets

CONTROLLER FOR ADJUSTING AN OUTPUT VOLTAGE OF A POWER CONVERTER AND RELATED METHOD THEREOF

CROSS REFERENCE TO RELATED APPLICATIONS

This application claims the benefit of U.S. Provisional Application No. 61/886,670, filed on Oct. 4, 2013 and entitled "Fast charge on PSR structure," the contents of which are incorporated herein by reference.

BACKGROUND OF THE INVENTION

1. Field of the Invention

The present invention relates to a controller for adjusting an output voltage of a power converter and a related method thereof, and particularly to a controller and a related method thereof that can adjust an output voltage of a power converter through a primary side of the power converter.

2. Description of the Prior Art

Generally speaking, the prior art utilizes a feedback control of a second side of a power converter to adjust an output voltage or an output current of the second side of the power converter through a primary side of the power converter. However, a controller of the second side of the power converter for detecting the output current, or a voltage controller and a photo-coupler will increase cost of the feedback control of the second side of the power converter. In addition, although another prior art can also utilize a primary-side regulation constant current/constant voltage technology to simultaneously control the output voltage and the output current of the second side of the power converter, if the output current of the second side of the power converter exceeds a fixed current value, the output current of the second side of the power converter is still limited to the fixed current value, resulting in output power of the second side of the power converter being still not fixed at a constant value. Therefore, the above mentioned prior arts are not good choices for a designer of the power converter.

SUMMARY OF THE INVENTION

An embodiment provides a controller for adjusting an output voltage of a power converter. The controller includes a gate control signal generation circuit, a feedback signal detection module, and a reference voltage generation module. The gate control signal generation circuit is used for generating a gate control signal to a power switch of a primary side of the power converter according to a reference voltage and a plurality of signals corresponding to the primary side and a second side of the power converter. The feedback signal detection module is coupled to the primary side of the power converter for generating a logic signal according to a combination corresponding to the plurality of signals. The reference voltage generation module is coupled to the feedback signal detection module for generating the reference voltage to the gate control signal generation circuit according to the logic signal. The power switch adjusts the output voltage of the second side of the power converter according to the gate control signal.

Another embodiment provides a method for adjusting an output voltage of a power converter, wherein a controller for adjusting the output voltage of the power converter comprises agate control signal generation circuit, a feedback signal detection module, and a reference voltage generation module. The method includes the feedback signal detection module generating a logic signal according to a combination of a plurality of signals corresponding to a primary side and a second side of the power converter; the reference voltage generation module generating a reference voltage to the gate control signal generation circuit according to the logic signal; the gate control signal generation circuit generating a gate control signal to a power switch of the primary side of the power converter according to the reference voltage and the plurality of signals corresponding to the primary side and the second side of the power converter; and the power switch adjusting the output voltage of the second side of the power converter according to the gate control signal.

Another embodiment provides a method for adjusting an output voltage of a power converter, wherein a controller for adjusting the output voltage of the power converter comprises agate control signal generation circuit, a feedback signal detection module, and a reference voltage generation module. The method includes the feedback signal detection module generating a logic signal according to a frequency of a gate control signal; the reference voltage generation module generating a reference voltage to the gate control signal generation circuit according to the logic signal; the gate control signal generation circuit generating a gate control signal to a power switch of a primary side of the power converter according to the reference voltage and a plurality of signals corresponding to the primary side and a second side of the power converter; and the power switch adjusting the output voltage of the second side of the power converter according to the gate control signal.

The present invention provides a controller for adjusting an output voltage of a power converter and the related method thereof. The controller and the method utilize a feedback signal detection module generates a logic signal according to a voltage peak corresponding to a current flowing through a power switch of a primary side of the power converter, a discharge time of a second side of the power converter, and a gate control signal, or according to a voltage corresponding to an auxiliary voltage generated by an auxiliary winding of the primary side of the power converter and a first reference voltage of a first reference voltage group, or according to a frequency of the gate control signal. Then, the controller and the method utilize a reference voltage generation module to generate a reference voltage to a gate control signal generation circuit according to the logic signal, and utilize the gate control signal generation circuit generates the gate control signal to the power switch according to the reference voltage, the voltage peak, the discharge time, and a period of the gate control signal. Thus, the power switch can adjust the output voltage of the second side of the power converter according to the gate control signal. Therefore, compared to the prior art, the present invention adjusts the output voltage of the second side of the power converter through the primary side of the power converter, the present invention can save cost of a controller of the second side of the power converter for detecting an output current of the second side of the power converter, or cost of a voltage controller and a photo-coupler. In addition, the present invention can also adjust (increase or decrease) the output voltage of the second side of the power converter to adjust the output current of the second side of the power converter under the power converter outputting fixed power.

These and other objectives of the present invention will no doubt become obvious to those of ordinary skill in the art

DETAILED DESCRIPTION

Figure 1:
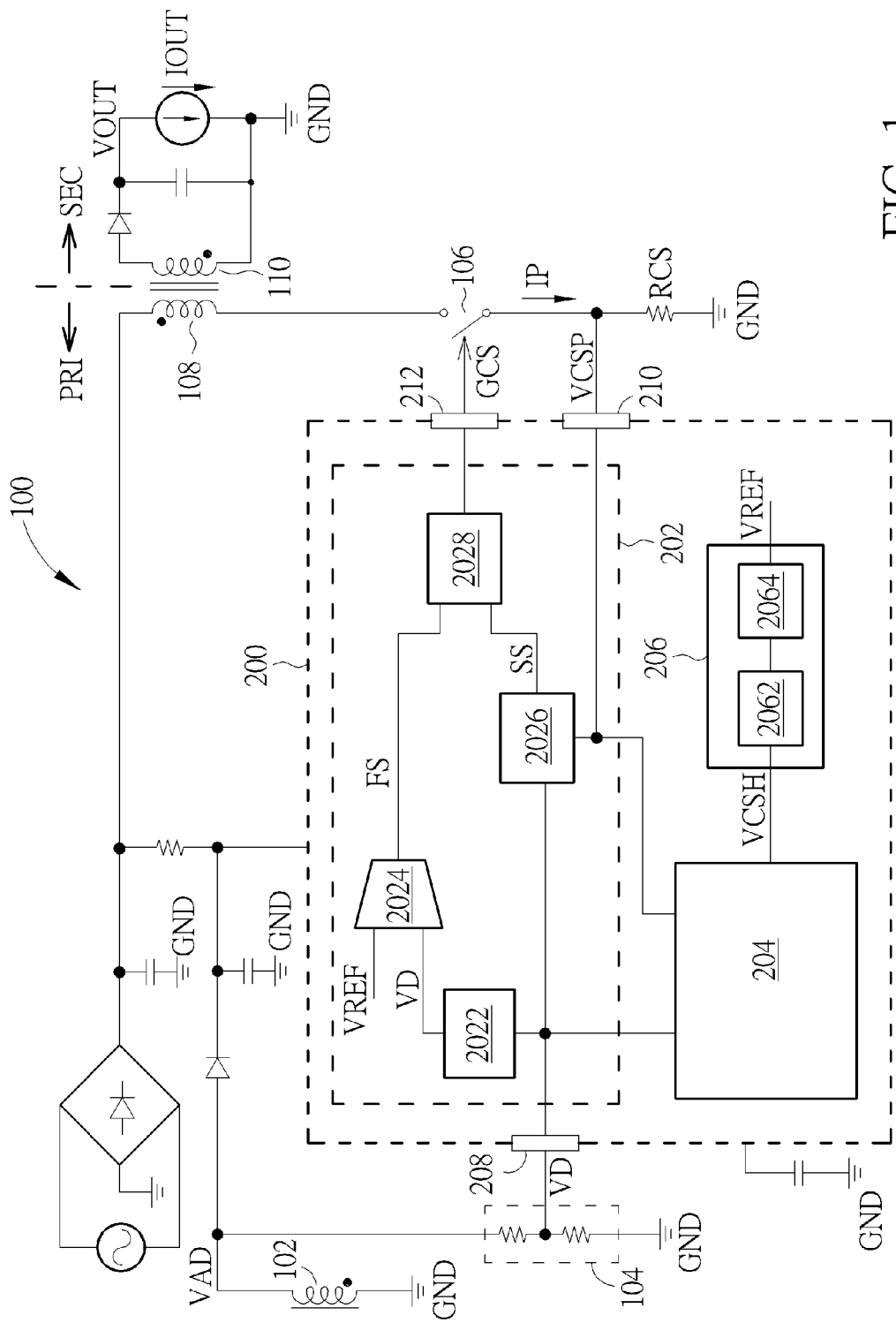
FIG. 1 is a diagram illustrating a controller for adjusting an output voltage of a power converter according to an embodiment.

Please refer to FIG. 1. FIG. 1 is a diagram illustrating a controller 200 for adjusting an output voltage VOUT of a power converter 100 according to an embodiment. As shown in FIG. 1, the controller 200 includes a gate control signal generation circuit 202, a feedback signal detection module 204, a reference voltage generation module 206, a feedback pin 208, a current detection pin 210, and a gate pin 212, wherein the gate control signal generation circuit 202 includes a sampling unit 2022, a transconductance unit 2024, a fixed current unit 2026, and a logic control unit 2028. As shown in FIG. 1, the sampling unit 2022 is used for sampling a voltage VD corresponding to an auxiliary voltage VAD generated by an auxiliary winding 102 of a primary side PRI of the power converter 100, wherein the voltage VD is used for determining a discharge time TDIS of a second side SEC of the power converter 100, the voltage VD is generated by a voltage divider 104, and the feedback pin 208 of the controller 200 is used for receiving the voltage VD. The transconductance unit 2024 is used for generating a first signal FS according to a reference voltage VREF and the voltage VD. The fixed current unit 2026 is used for generating a second signal SS according to the discharge time TDIS, a voltage peak VCSP corresponding to a current IP flowing through the power switch 106 of the primary side PRI of the power converter 100, and a period T of a gate control signal GCS, wherein the current detection pin 210 is used for receiving the voltage peak VCSP, and the voltage peak VCSP is determined by the current IP flowing through the power switch 106 and a resistor RCS coupled to the power switch 106. The logic control unit 2028 is used for generating the gate control signal GCS to the power switch 106 according to the first signal FS and the second signal SS, wherein the gate control signal GCS is transmitted to the power switch 106 through the gate pin 212. The feedback signal detection module 204 is coupled to the primary side PRI of the power converter 100 for generating a logic signal VCSH according to the voltage peak VCSP, the discharge time TDIS of the second side SEC of the power converter 100, and the gate control signal GCS. The reference voltage generation module 206 is coupled to the feedback signal detection module 204 for generating the reference voltage VREF to the gate control signal generation circuit 202 according to the logic signal VCSH. As shown in FIG. 1, the reference voltage generation module 206 includes a counter 2062 and a first logic unit 2064. The counter 2062 is used for counting an enabling interval of the logic signal VCSH. The first logic unit 2064 is used for generating the reference voltage VREF to the gate control signal generation circuit 202 according to a predetermined mode of enabling intervals of a plurality of logic signals VCSH. In addition, the power switch 106 can adjust the output voltage VOUT of the second side SEC of the power converter 100 through an output current IOUT of the second side SEC of the power converter 100 according to the gate control signal GCS, wherein the output current IOUT can be determined by equation (1):

$$IOUT = \frac{NP}{NS} \times \frac{VCSP}{2 \times RCS} \times \frac{TDIS}{T} \quad (1)$$

Figure 2:
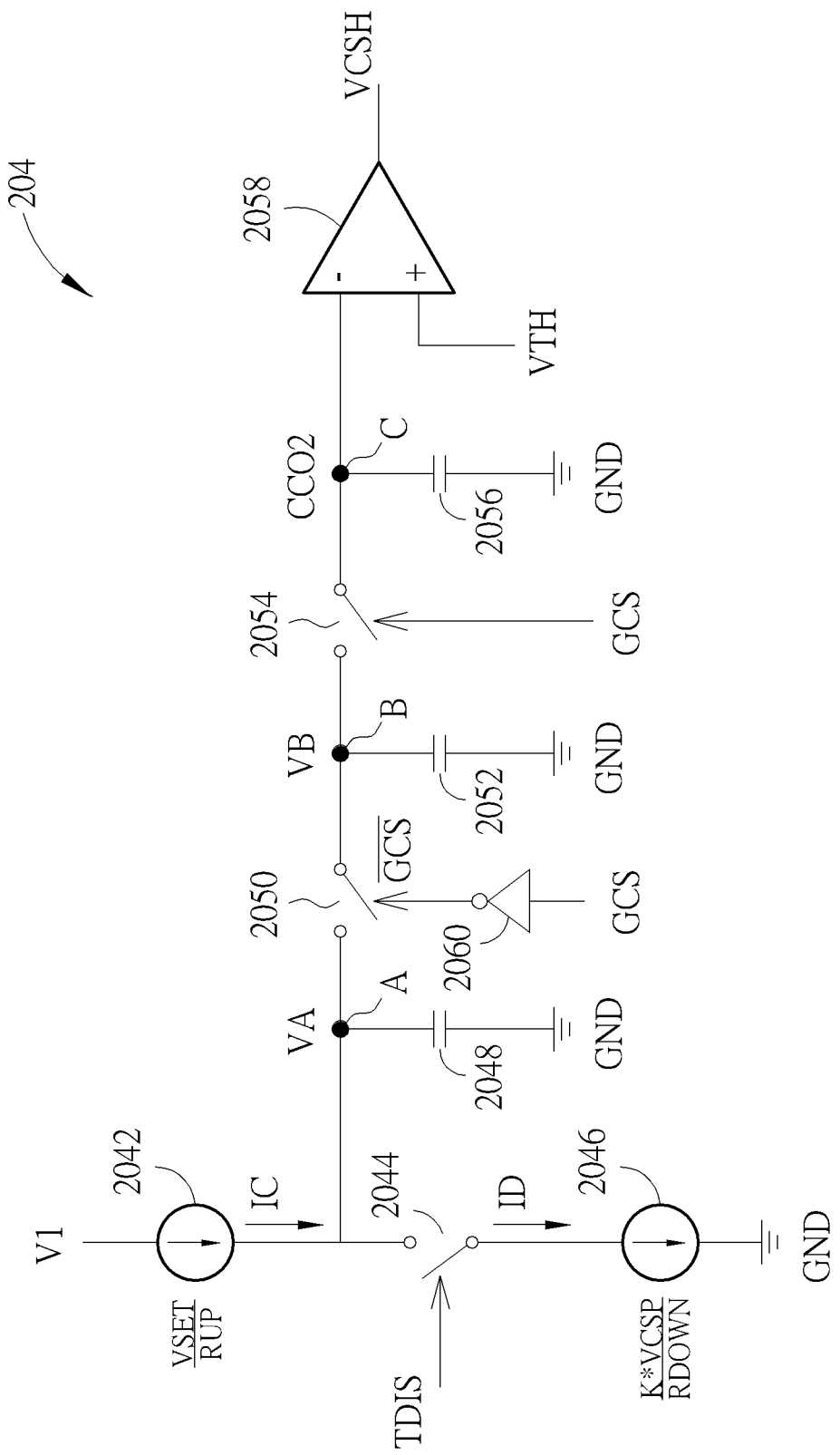
FIG. 2 is a diagram illustrating the feedback signal detection module.

As shown in equation (1), $$\frac{NP}{NS}$$

is a turn ratio of a winding 108 of the primary side PRI to a winding 110 of the second side SEC. Please refer to FIG. 2. FIG. 2 is a diagram illustrating the feedback signal detection module 204. As shown in FIG. 2, the feedback signal detection module 204 includes a first fixed current source 2042, a first switch 2044, a second fixed current source 2046, a first capacitor 2048, a second switch 2050, a second capacitor 2052, a third switch 2054, a third capacitor 2056, and a second comparator 2058. As shown in FIG. 2, the first fixed current source 2042 has a first terminal for receiving a first voltage V1, and a second terminal, wherein the first fixed current source 2042 is used for providing a charge current IC, and the charge current IC is determined by a setting voltage VSET (wherein the setting voltage VSET is set by a user) and an upper resistor RUP. The first switch 2044 has a first terminal coupled to the second terminal of the first fixed current source 2042, a control terminal, and a third terminal, wherein the first switch 2044 is turned on and turned off according to the discharge time TDIS of the second side SEC of the power converter 100. The second fixed current source 2046 has a first terminal coupled to the third terminal of the first switch 2044, and a second terminal coupled to ground GND, wherein the second fixed current source 2046 is used for providing a discharge current ID, and the discharge current ID is determined by K multiple of the voltage peak VCSP and a lower resistor RDOWN, wherein K is a positive real number. The first capacitor 2048 has a first terminal coupled to the second terminal of the first fixed current source 2042, a second terminal coupled to the ground GND. The second switch 2050 has a first terminal coupled to the second terminal of the first fixed current source 2042, a control terminal, and a third terminal, wherein the second switch 2050 is turned on and turned off according to an inverse gate control signal $\overline{GCS}$, and the inverse gate control signal $\overline{GCS}$ is generated by the gate control signal GCS passing an inverter 2060. The second capacitor 2052 has a first terminal coupled to the third terminal of the second switch 2050, and a second terminal coupled to the ground GND. The third switch 2054 has a first terminal coupled to the third terminal of the second switch 2050, a control terminal, and a third terminal wherein the third switch 2054 is turned on and turned off according to the gate control signal GCS. The third capacitor 2056 has a first terminal coupled to the third terminal of the third switch 2054, a second terminal coupled to the ground GND. The second comparator 2058 has a first terminal coupled to the first terminal of the third capacitor 2056, a second terminal for receiving a threshold voltage VTH, and a third terminal, wherein the second comparator 2058 is used for generating the logic signal VCSH according to a voltage CCO2 of the first terminal of the third capacitor 2056 and the threshold voltage VTH.

As shown in FIG. 2, the charge current IC charges the first capacitor 2048 during the period T of the gate control signal GCS, and the discharge current ID discharges the first capacitor 2048 during the discharge time TDIS of the second side SEC of the power converter 100. Therefore, when charges provided by the charge current IC during the period T of the gate control signal GCS are equal to charges provided by the discharge current ID during the discharge time TDIS of the second side SEC of the power converter 100, equation (2) holds.

$$\frac{RDOWN \times VSET}{K \times RUP} = VCSP \times \frac{TDIS}{T} \quad (2)$$

Figure 3:
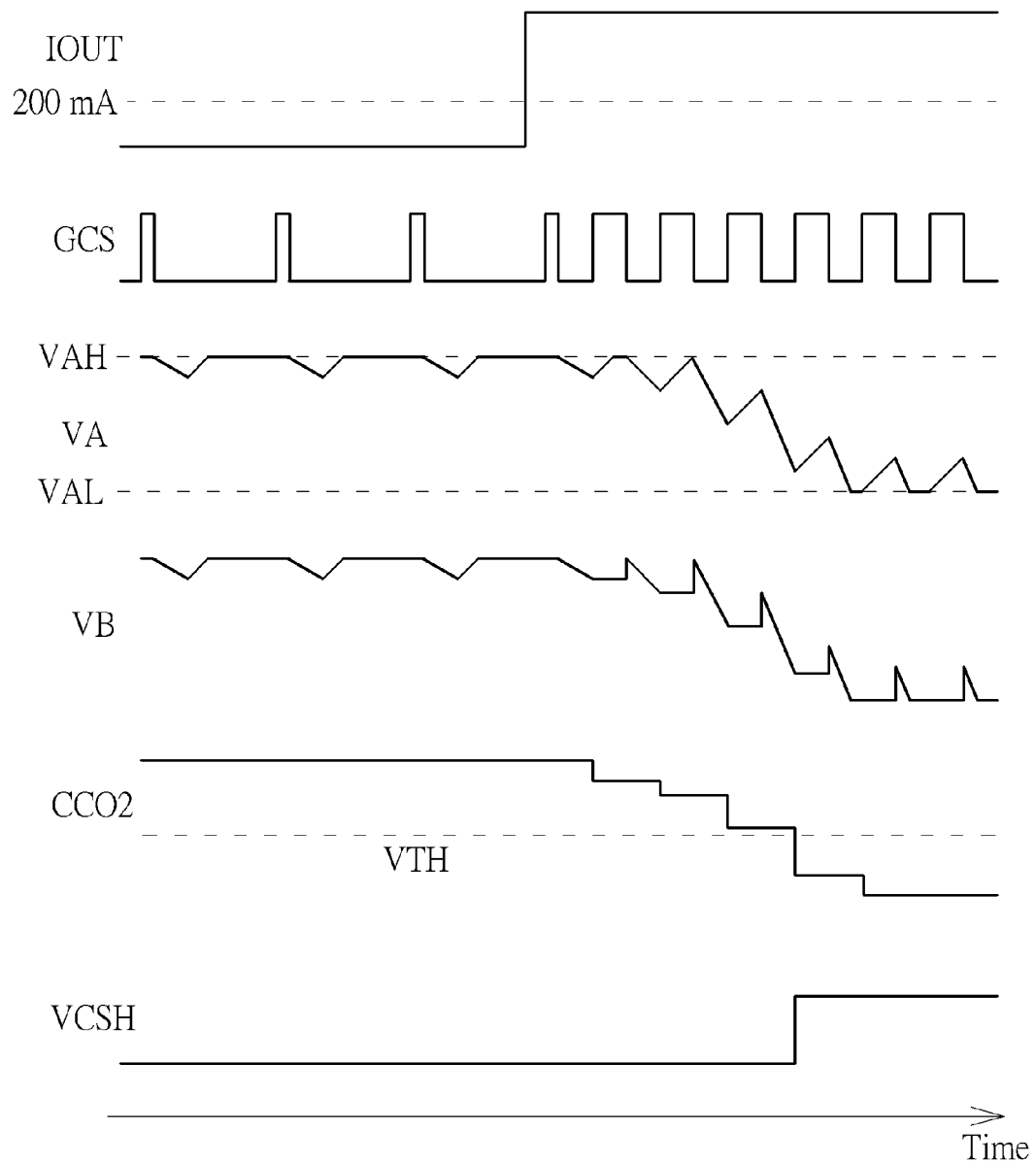
FIG. 3 is a diagram illustrating the gate control signal, a voltage of the first terminal of the first capacitor, a voltage of the first terminal of the second capacitor, a voltage of the first terminal of the third capacitor, and the logic signal when the output current of the second side is changed.

Substituting equation (2) into equation (1) can yield the output current IOUT of the second side SEC of the power converter 100. Please refer to FIG. 3. FIG. 3 is a diagram illustrating the gate control signal GCS, a voltage VA of the first terminal (a node A) of the first capacitor 2048, a voltage VB of the first terminal (a node B) of the second capacitor 2052, the voltage CCO2 of the first terminal (a node C) of the third capacitor 2056, and the logic signal VCSH when the output current IOUT of the second side SEC is changed. As shown in FIG. 3, when the output current IOUT is greater than a predetermined value (e.g. 200 mA), the voltage VA is decreased to a lower limit value VAL; and when the output current IOUT is less than the predetermined value, the voltage VA is increased to a ceiling limit value VAH. As shown in FIG. 3, when the gate control signal GCS is disabled, because the second switch 2050 is turned on, the second capacitor 2052 can simultaneously sample the voltage VA to generate the voltage VB of the node B; and when the gate control signal GCS is enabled, because the third switch 2054 is turned on, the third capacitor 2056 can hold a peak of the voltage VB to generate the voltage CCO2. Then, the second comparator 2058 of the feedback signal detection module 204 can compare the voltage CCO2 with the threshold voltage VTH to generate the logic signal VCSH. As shown in FIG. 3, because the logic signal VCSH is changed with variation of the output current IOUT, the logic signal VCSH has information of the variation of the output current IOUT. Because the logic signal VCSH has the information of the variation of the output current IOUT, reference voltage generation module 206 can generate the reference voltage VREF to the gate control signal generation circuit 202 according to the logic signal VCSH, wherein the reference voltage VREF also has the information of the variation of the output current IOUT.

Figure 4:
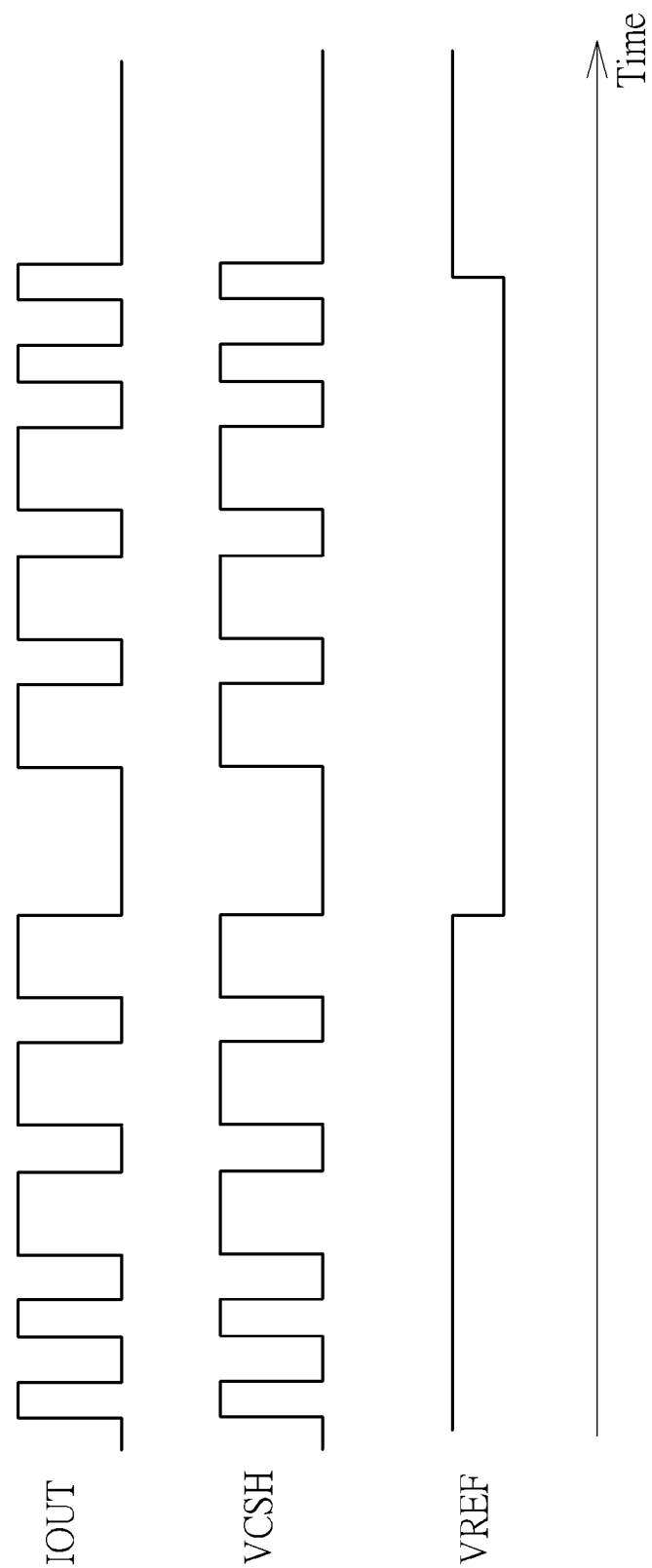
FIG. 4 is a diagram illustrating the output current, the logic signal, and the reference voltage.

Please refer to FIG. 4. FIG. 4 is a diagram illustrating the output current IOUT, the logic signal VCSH, and the reference voltage VREF. Because the logic signal VCSH has the information of the variation of the output current IOUT, variation of the logic signal VCSH can represent the variation of the output current IOUT. Therefore, the first logic unit 2064 can generate the reference voltage VREF to the transconductance unit 2024 of the gate control signal generation circuit 202 according to a predetermined mode of enabling intervals of a plurality of logic signals VCSH. For example, when 5 enabling intervals of 5 logic signals VCSH meet a first predetermined mode (three longer enabling intervals are behind two shorter enabling intervals), the reference voltage VREF generated by the first logic unit 2064 is low; and when 5 enabling intervals of 5 logic signals VCSH meet a second predetermined mode (two shorter enabling intervals are behind three longer enabling intervals), the reference voltage VREF generated by the first logic unit 2064 is high. But, the present invention is not limited to the above mentioned first predetermined mode and second predetermined mode. Because the reference voltage VREF has the information of the variation of the output current IOUT, the gate control signal GCS generated by the gate control signal generation circuit 202 also has the information of the variation of the output current IOUT. Thus, the controller 200 can adjust (increase or decrease) the output voltage VOUT of the second side SEC of the power converter 100 through the gate control signal GCS under the power converter 100 outputting fixed power.

Figure 5:
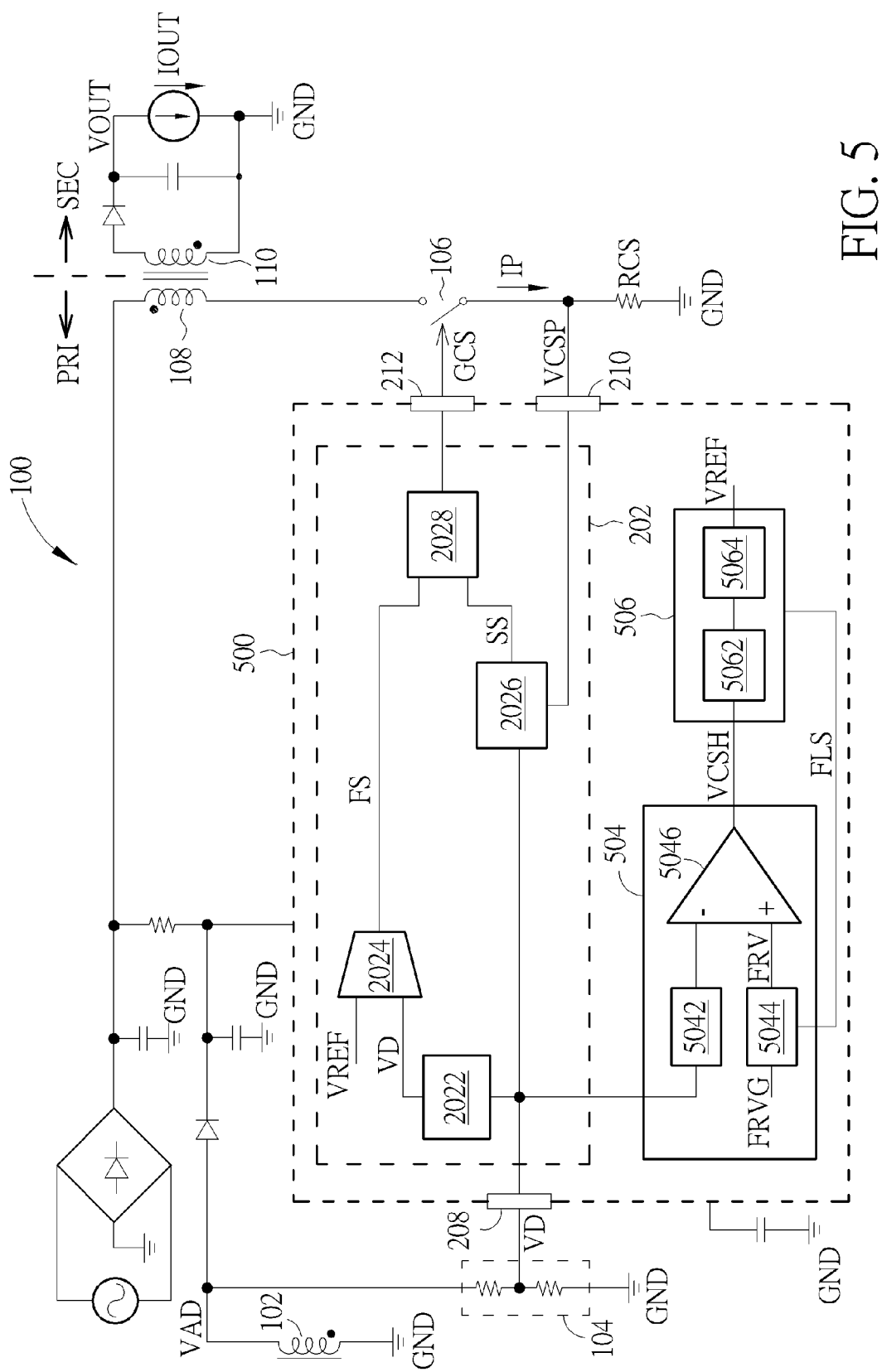
FIG. 5 is a diagram illustrating a controller for adjusting an output voltage of a power converter according to another embodiment.

Please refer to FIG. 5. FIG. 5 is a diagram illustrating a controller 500 for adjusting an output voltage VOUT of a power converter 100 according to another embodiment. As shown in FIG. 5, differences between the controller 500 and the controller 200 are that a feedback signal detection module 504 of the controller 500 generates a logic signal VCSH according to a voltage VD corresponding to an auxiliary voltage VAD generated by an auxiliary winding 102 of the primary side PRI of the power converter 100 and a first reference voltage FRV of a first reference voltage group FRVG; and a reference voltage generation module 506 of the controller 500 not only can generate a reference voltage VREF, but can also generate a first logic signal FLS to the feedback signal detection module 504, wherein the first reference voltage group FRVG is set by the user. As shown in FIG. 5, the feedback signal detection module 504 includes a sampling circuit 5042, a multiplexer 5044, and a first comparator 5046. The sampling circuit 5042 is used for sampling the voltage VD; the multiplexer 5044 is used for outputting the first reference voltage FRV from the first reference voltage group FRVG according to the first logic signal FLS; and the first comparator 5046 has a first terminal coupled to the sampling circuit 5042 for receiving the voltage VD, a second terminal coupled to the multiplexer 5044 for receiving the first reference voltage FRV, and a third terminal for outputting the logic signal VCSH, wherein the first comparator 5046 is used for outputting the logic signal VCSH according to the voltage VD and the first reference voltage FRV. As shown in FIG. 5, the reference voltage generation module 506 includes a counter 5062 and a first logic unit 5064. The counter 5062 is used for counting an enabling interval of the logic signal VCSH; and the first logic unit 5064 is used for generating the reference voltage VREF to the gate control signal generation circuit 202 and the first logic signal FLS to the multiplexer 5044 according to a predetermined mode of enabling intervals of a plurality of logic signals VCSH. In addition, subsequent operational principles of the controller 500 are the same as those of the controller 200, so further description thereof is omitted for simplicity.

Figure 6:
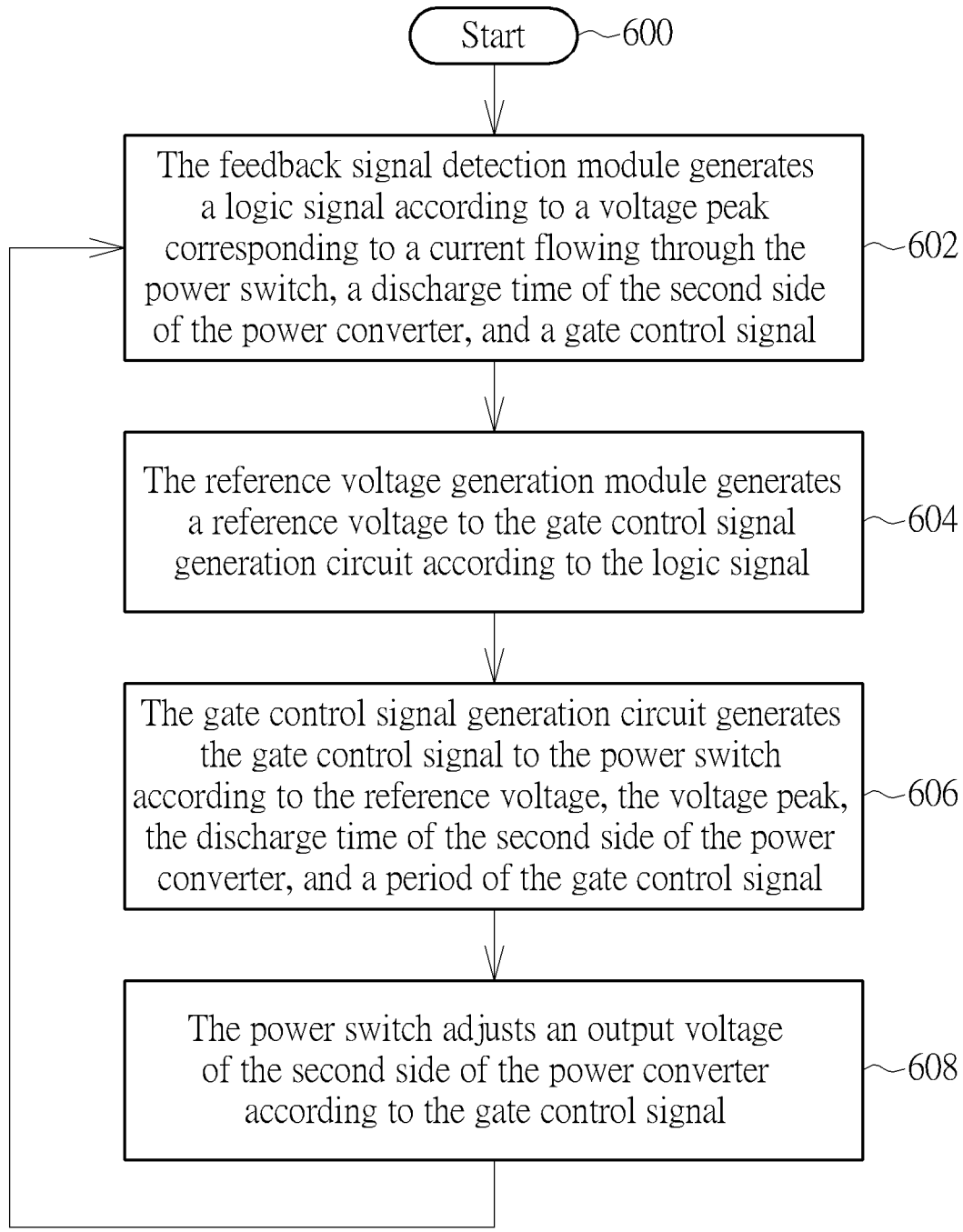
FIG. 6 is a flowchart illustrating a method for adjusting an output voltage of a power converter according to another embodiment.

Please refer to FIG. 1, FIG. 2, FIG. 3, FIG. 4, and FIG. 6 is a flowchart illustrating a method for adjusting an output voltage of a power converter according to another embodiment. The method in FIG. 6 is illustrated using the controller 200 in FIG. 1. Detailed steps are as follows:

Step 600: Start.

Step 602: The feedback signal detection module 204 generates a logic signal VCSH according to a voltage peak VCSP corresponding to a current IP flowing through the power switch 106, a discharge time TDIS of the second side SEC of the power converter 100, and a gate control signal GCS.

Step 604: The reference voltage generation module 206 generates a reference voltage VREF to the gate control signal generation circuit 202 according to the logic signal VCSH.

Step 606: The gate control signal generation circuit 202 generates the gate control signal GCS to the power switch 106 according to the reference voltage VREF, the voltage peak VCSP, the discharge time TDIS of the second side SEC of the power converter 100, and a period T of the gate control signal GCS.

Step 608: The power switch 106 adjusts an output voltage VOUT of the second side SEC of the power converter 100 according to the gate control signal GCS, go to Step 602.

In Step 602, as shown in FIG. 2, the charge current IC charges the first capacitor 2048 during the period T of the gate control signal GCS, and the discharge current ID discharges the first capacitor 2048 during the discharge time TDIS of the second side SEC of the power converter 100. Therefore, the charge current IC and the discharge current ID can determine a voltage VA of the node A. As shown in FIG. 2 and FIG. 3, when the gate control signal GCS is disabled, because the second switch 2050 is turned on, the second capacitor 2052 can simultaneously sample the voltage VA to generate a voltage VB of the node B; and when the gate control signal GCS is enabled, because the third switch 2054 is turned on, the third capacitor 2056 can hold a peak of the voltage VB to generate a voltage CCO2. Then, the second comparator 2058 of the feedback signal detection module 204 can compare the voltage CCO2 with the threshold voltage VTH to generate the logic signal VCSH. As shown in FIG. 3, because the logic signal VCSH is changed with variation of an output current IOUT of the second side SEC of the power converter 100, the logic signal VCSH has information of the variation of the output current IOUT. Because the logic signal VCSH has the information of the variation of the output current IOUT, the reference voltage generation module 206 can generate the reference voltage VREF to the gate control signal generation circuit 202 according to the logic signal VCSH, wherein the reference voltage VREF also has the information of the variation of the output current IOUT.

In Step 604, the counter 2062 of the reference voltage generation module 206 is used for counting an enabling interval of the logic signal VCSH; and the first logic unit 2064 of the reference voltage generation module 206 is used for generating the reference voltage VREF to the gate control signal generation circuit 202 according to a predetermined mode of enabling intervals of a plurality of logic signals VCSH. Because the logic signal VCSH has the information of the variation of the output current IOUT, variation of the logic signal VCSH can represent the variation of the output current IOUT. Therefore, the first logic unit 2064 can generate the reference voltage VREF to the transconductance unit 2024 of the gate control signal generation circuit 202 according to the predetermined mode of enabling intervals of a plurality of logic signals VCSH. For example, as shown in FIG. 4, when 5 enabling intervals of 5 logic signals VCSH meet a first predetermined mode (three longer enabling intervals are behind two shorter enabling intervals), the reference voltage VREF generated by the first logic unit 2064 is low; and when enabling intervals of 5 logic signals VCSH meet a second predetermined mode (two shorter enabling intervals are behind three longer enabling intervals), the reference voltage VREF generated by the first logic unit 2064 is high. But, the present invention is not limited to the above mentioned first predetermined mode and second predetermined mode.

In Step 606, as shown in FIG. 1, the sampling unit 2022 samples a voltage VD corresponding to an auxiliary voltage VAD generated by the auxiliary winding 102 of the primary side PRI of the power converter 100, wherein the voltage VD is used for determining the discharge time TDIS of the second side SEC of the power converter 100. The transconductance unit 2024 generates a first signal FS according to the reference voltage VREF and the voltage VD. The fixed current unit 2026 generates a second signal SS according to the discharge time TDIS, the voltage peak VCSP, and the period T of the gate control signal GCS. The logic control unit 2028 is used for generating the gate control signal GCS to the power switch 106 according to the first signal FS and the second signal SS.

In Step 608, the power switch 106 can adjust the output voltage VOUT of the second side SEC of the power converter 100 through the output current IOUT of the second side SEC of the power converter 100 according to the gate control signal GCS. Because the reference voltage VREF has the information of the variation of the output current IOUT, the gate control signal GCS generated by the gate control signal generation circuit 202 also has the information of the variation of the output current IOUT. Thus, the controller 200 can adjust (increase or decrease) the output voltage VOUT of the second side SEC of the power converter 100 through the gate control signal GCS.

Figure 7:
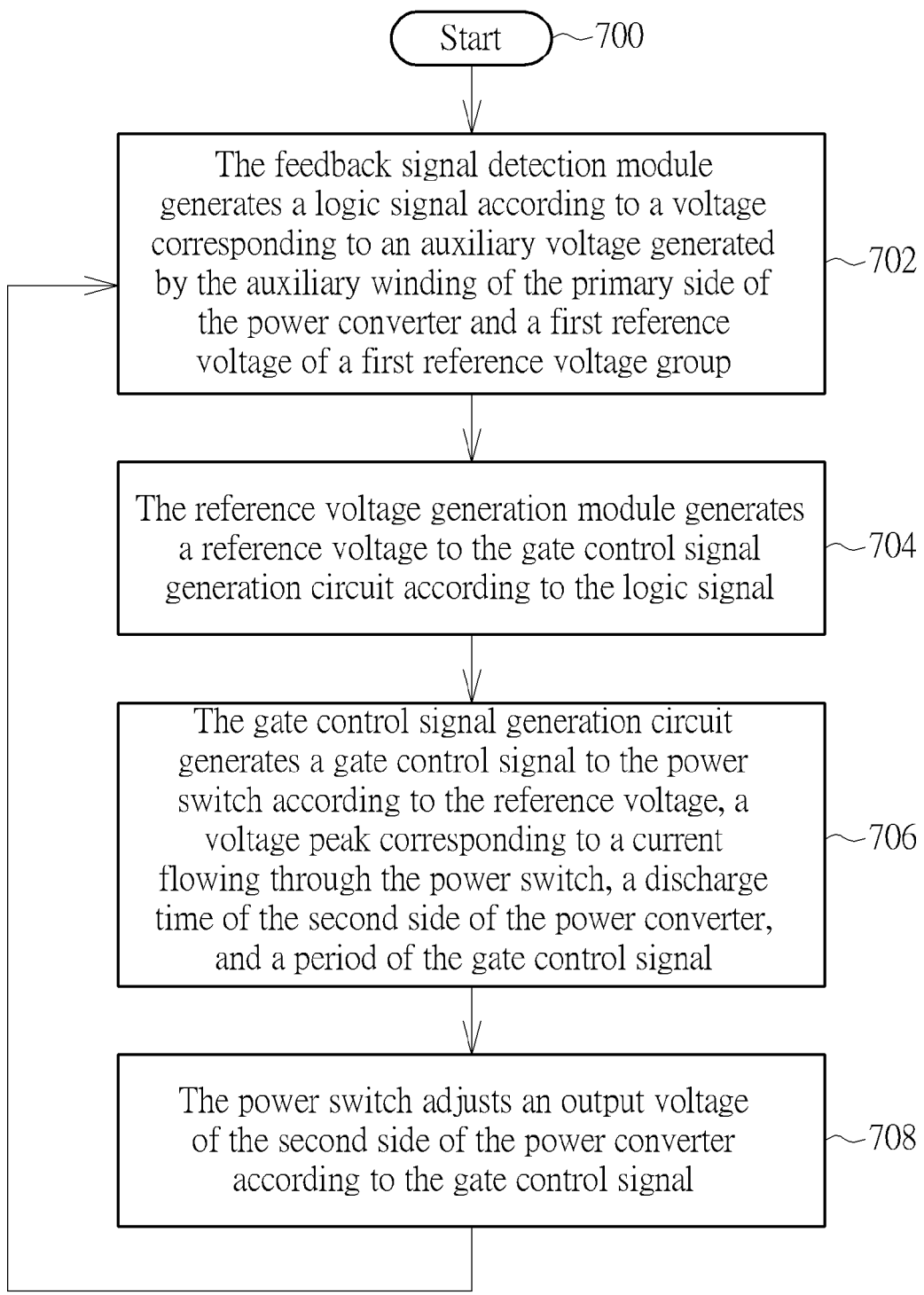
FIG. 7 is a flowchart illustrating a method for adjusting an output voltage of a power converter according to another embodiment.

Please refer to FIG. 5 and FIG. 7. FIG. 7 is a flowchart illustrating a method for adjusting an output voltage of a power converter according to another embodiment. The method in FIG. 7 is illustrated using the controller 500 in FIG. 5. Detailed steps are as follows:

Step 700: Start.

Step 702: The feedback signal detection module 504 generates a logic signal VCSH according to a voltage VD corresponding to an auxiliary voltage VAD generated by the auxiliary winding 102 of the primary side PRI of the power converter 100 and a first reference voltage FRV of a first reference voltage group FRVG.

Step 704: The reference voltage generation module 506 generates a reference voltage VREF to the gate control signal generation circuit 202 according to the logic signal VCSH.

Step 706: The gate control signal generation circuit 202 generates a gate control signal GCS to the power switch 106 according to the reference voltage VREF, a voltage peak VCSP corresponding to a current IP flowing through the power switch 106, a discharge time TDIS of the second side SEC of the power converter 100, and a period T of the gate control signal GCS.

Step 708: The power switch 106 adjusts an output voltage VOUT of the second side SEC of the power converter 100 according to the gate control signal GCS, go to Step 702.

Differences between the embodiment of FIG. 7 and the embodiment of FIG. 6 are that in Step 702, as shown in FIG. 5, the feedback signal detection module 504 generates the logic signal VCSH according to the voltage VD and the first reference voltage FRV; and in Step 704, the reference voltage generation module 506 not only can generate the reference voltage VREF, but can also generate a first logic signal FLS to the feedback signal detection module 504. In addition, subsequent operational principles of the embodiment of FIG. 7 are the same as those of the embodiment of FIG. 6, so further description thereof is omitted for simplicity.

Figure 8:
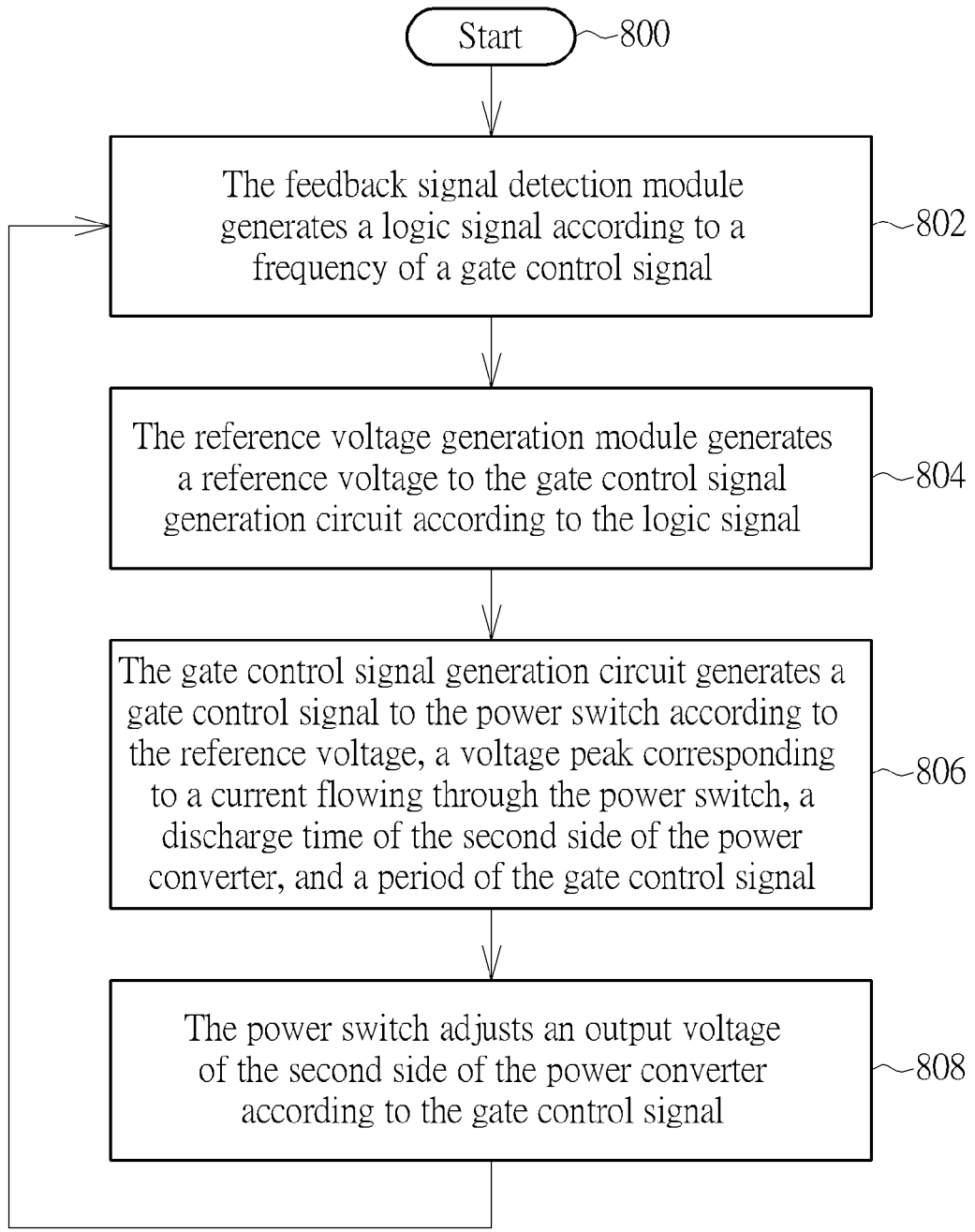
FIG. 8 is a flowchart illustrating a method for adjusting an output voltage of a power converter according to another embodiment.

Please refer to FIG. 8. FIG. 8 is a flowchart illustrating a method for adjusting an output voltage of a power converter according to another embodiment. Detailed steps are as follows:

Step 800: Start.

Step 802: The feedback signal detection module generates a logic signal VCSH according to a frequency of a gate control signal GCS.

Step 804: The reference voltage generation module generates a reference voltage VREF to the gate control signal generation circuit 202 according to the logic signal VCSH.

Step 806: The gate control signal generation circuit 202 generates a gate control signal GCS to the power switch 106 according to the reference voltage VREF, a voltage peak VCSP corresponding to a current IP flowing through the power switch 106, a discharge time TDIS of the second side SEC of the power converter 100, and a period T of the gate control signal GCS.

Step 808: The power switch 106 adjusts an output voltage VOUT of the second side SEC of the power converter 100 according to the gate control signal GCS, go to Step 802.

A difference between the embodiment of FIG. 8 and the embodiment of FIG. 7 is that in Step 802, the feedback signal detection module generates the logic signal VCSH according to the frequency of the gate control signal GCS. In addition, subsequent operational principles of the embodiment of FIG. 8 are the same as those of the embodiment of FIG. 7, so further description thereof is omitted for simplicity.

In addition, in another embodiment of the present invention, the feedback signal detection module generates a logic signal VCSH according to a combination of Step 602, Step 702, and Step 802.

To sum up, the controller for adjusting an output voltage of a power converter and the related method thereof utilize the feedback signal detection module generates a logic signal according to a voltage peak corresponding to a current flowing through the power switch of the primary side of the power converter, a discharge time of the second side of the power converter, and a gate control signal, or according to a voltage corresponding to an auxiliary voltage generated by the auxiliary winding of the primary side of the power converter and a first reference voltage of a first reference voltage group, or according to a frequency of the gate control signal. Then, the controller and the method utilize the reference voltage generation module to generate a reference voltage to the gate control signal generation circuit according to the logic signal, and utilize the gate control signal generation circuit generates the gate control signal to the power switch according to the reference voltage, the voltage peak, the discharge time, and a period of the gate control signal. Thus, the power switch can adjust an output voltage of the second side of the power converter according to the gate control signal. Therefore, compared to the prior art, the present invention adjusts the output voltage of the second side of the power converter through the primary side of the power converter, the present invention can save cost of a controller of the second side of the power converter for detecting an output current of the second side of the power converter, or cost of a voltage controller and a photocoupler. In addition, the present invention can also adjust (increase or decrease) the output voltage of the second side of the power converter to adjust the output current of the second side of the power converter under the power converter outputting fixed power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for adjusting an output voltage of a power converter, the controller comprising:
 a gate control signal generation circuit for generating a gate control signal to a power switch of a primary side of the power converter according to a reference voltage and a plurality of signals corresponding to the primary side and a second side of the power converter;
 a feedback signal detection module coupled to the primary side of the power converter for generating a logic signal according to a voltage corresponding to an auxiliary voltage generated by an auxiliary winding of the primary side of the power converter and a first reference voltage of a first reference voltage group, wherein the feedback signal detection module comprises:
  a sampling circuit for sampling the voltage;
  a multiplexer for outputting the first reference voltage from the first reference voltage group according to a first logic signal; and
  a first comparator having a first terminal coupled to the sampling circuit for receiving the voltage, a second terminal coupled to the multiplexer for receiving the first reference voltage, and a third terminal for outputting the logic signal, wherein the first comparator outputs the logic signal according to the voltage and the first reference voltage; and
 a reference voltage generation module coupled to the feedback signal detection module for generating the reference voltage to the gate control signal generation circuit according to the logic signal;
 wherein the power switch adjusts the output voltage of the second side of the power converter according to the gate control signal.

2. The controller of claim 1, wherein the plurality of signals comprise a voltage peak corresponding to a current flowing through the power switch of the primary side, a discharge time of the second side of the power converter, and a period of the gate control signal.

3. The controller of claim 2, further comprising:
 a feedback pin for receiving a voltage corresponding to an auxiliary voltage generated by an auxiliary winding of the primary side of the power converter, wherein the voltage is used for determining the discharge time of the second side of the power converter and the voltage is generated by a voltage divider;
 a current detection pin for receiving the voltage peak, wherein the voltage peak is determined by the current flowing through the power switch of the primary side and a resistor coupled to the power switch; and a gate pin, wherein the gate control signal is transmitted to the power switch through the gate pin.

4. The controller of claim 1, wherein the reference voltage generation module comprises:
   a counter for counting an enabling interval of the logic signal; and
   a first logic unit for generating the reference voltage to the gate control signal generation circuit and the first logic signal to the multiplexer according to a predetermined mode of enabling intervals of a plurality of logic signals.

5. A controller for adjusting an output voltage of a power converter, the controller comprising:
   a gate control signal generation circuit for generating a gate control signal to a power switch of a primary side of the power converter according to a reference voltage and a plurality of signals corresponding to the primary side and a second side of the power converter;
   a feedback signal detection module coupled to the primary side of the power converter for generating a logic signal according to a voltage peak corresponding to a current flowing through the power switch of the primary side, a discharge time of the second side of the power converter and the gate control signal, wherein the feedback signal detection module comprises:
      a first fixed current source having a first terminal for receiving a first voltage, and a second terminal, wherein the first fixed current source is used for providing a charge current, and the charge current is determined by a setting voltage and an upper resistor;
      a first switch having a first terminal coupled to the second terminal of the first fixed current source, a control terminal, and a third terminal, wherein the first switch is turned on and turned off according to the discharge time of the second side of the power converter;
      a second fixed current source having a first terminal coupled to the third terminal of the first switch, and a second terminal coupled to ground, wherein the second fixed current source is used for providing a discharge current, and the discharge current is determined by K multiple of the voltage peak and a lower resistor, wherein K is a positive real number;
      a first capacitor having a first terminal coupled to the second terminal of the first fixed current source, a second terminal coupled to the ground;
      a second switch having a first terminal coupled to the second terminal of the first fixed current source, a control terminal, and a third terminal, wherein the second switch is turned on and turned off according to an inverse gate control signal, and the inverse gate control signal is generated by an inverter;
      a second capacitor having a first terminal coupled to the third terminal of the second switch, a second terminal coupled to the ground;
      a third switch having a first terminal coupled to the third terminal of the second switch, a control terminal, and a third terminal, wherein the third switch is turned on and turned off according to the gate control signal;
      a third capacitor having a first terminal coupled to the third terminal of the third switch, a second terminal coupled to the ground; and
      a second comparator having a first terminal coupled to the first terminal of the third capacitor, a second terminal for receiving a threshold voltage, and a third terminal, wherein the second comparator is used for generating the logic signal according to a voltage of the first terminal of the third capacitor and the threshold voltage; and
   a reference voltage generation module coupled to the feedback signal detection module for generating the reference voltage to the gate control signal generation circuit according to the logic signal;
   wherein the power switch adjusts the output voltage of the second side of the power converter according to the gate control signal.

6. The controller of claim 5, wherein the reference voltage generation module comprises:
   a counter for counting an enabling interval of the logic signal; and
   a first logic unit for generating the reference voltage to the gate control signal generation circuit according to a predetermined mode of enabling intervals of a plurality of logic signals.

* * * * *